(12) United States Patent
Lu et al.

(10) Patent No.: US 10,482,047 B2
(45) Date of Patent: Nov. 19, 2019

(54) SLAVE DEVICE CONNECTED TO MASTER DEVICE VIA I2C BUS AND COMMUNICATION METHOD THEREOF

(71) Applicant: AutoChips Inc., Hefei, Anhui Province (CN)

(72) Inventors: Shujie Lu, Hefei (CN); Zhe Wu, Hefei (CN)

(73) Assignee: AUTOCHIPS INC., Hefei (CN)

( * ) Notice: Subject to any disclaimer, the term of this patent is extended or adjusted under 35 U.S.C. 154(b) by 21 days.

(21) Appl. No.: 15/835,457

(22) Filed: Dec. 8, 2017

(65) Prior Publication Data
US 2018/0165232 A1    Jun. 14, 2018

(30) Foreign Application Priority Data
Dec. 9, 2016 (CN) .......................... 2016 1 1127631

(51) Int. Cl.
   *G06F 13/364*     (2006.01)
   *G06F 13/42*      (2006.01)
   *G06F 13/40*      (2006.01)

(52) U.S. Cl.
CPC ........ *G06F 13/364* (2013.01); *G06F 13/4022* (2013.01); *G06F 13/4282* (2013.01); *G06F 2213/0016* (2013.01)

(58) Field of Classification Search
None
See application file for complete search history.

(56) References Cited

U.S. PATENT DOCUMENTS

| 9,298,908 B1 | 3/2016 | Booth et al. |
| 2010/0272102 A1 | 10/2010 | Kobayashi |
| 2012/0239841 A1 | 9/2012 | Trifonov et al. |

FOREIGN PATENT DOCUMENTS

| CN | 1633128 A | 6/2005 |
| CN | 102023954 A | 4/2011 |
| CN | 105786753 A | 7/2016 |
| JP | 2008242884 A | 10/2008 |
| TW | 201447559 A | 12/2014 |
| TW | 201531864 A | 8/2015 |

*Primary Examiner* — Idriss N Alrobaye
*Assistant Examiner* — Dayton Lewis-Taylor

(57) ABSTRACT

The present disclosure discloses a communication method for a slave device connected to a master device via an I2C bus. The method includes detecting the condition of a byte end flag when the slave device is in a transmission mode, and clearing the byte end flag to stop transmitting data to the master device as the slave device is in the transmission mode when the byte end flag is detected to be in a first condition. The first condition indicates all data requested by the master device has been transmitted by the slave device. The present disclosure further discloses a slave device using the above-mentioned communication method. When the slave device is in the transmission mode, it is unnecessary to switch the operation mode of the slave device to stop the slave device from continuing transmitting data when the last byte of data has been transmitted.

15 Claims, 3 Drawing Sheets

SLAVE DEVICE CONNECTED TO MASTER DEVICE VIA I2C BUS AND COMMUNICATION METHOD THEREOF

CROSS REFERENCE TO RELATED APPLICATIONS

This application claims priority to China Patent Application No. 201611127631.5, filed Dec. 9, 2016, in the State Intellectual Property Office of China, the content of which is hereby incorporated by reference herein as if set forth in its entirety.

TECHNICAL FIELD

The present disclosure relates to the field of communications, and in particular, to a slave device connected to a master device via an I2C bus and a communication method thereof.

BACKGROUND

I2C serial bus consists of two serial lines which are Serial Data line (SDA) and Serial Clock line (SCL), which are responsible for data transmission and clock signal, respectively. The master/slave communication mode is adopted as its communication manner, in which a master device initiates communication (read/write request) and provides a bus clock signal. A slave device acknowledges to the request of the master device, for instance, judging various addresses, command bit, data, acknowledgement bit, etc. transmitted by the master device determined in time, and then controls a register to adjust the mode of its own through software configuration according to a different mode, so as to communicate with the master device.

In a traditional I2C design, the next byte of data is triggered to be transmitted according to the empty and full of a data register. Therefore, when the slave device is in a transmission state, the data register becomes empty after the last byte of data has been transmitted, in which a transmission request flag signal will still be triggered and the data will still be filled into the data register, as indicated by the dashed box in FIG. 1. The master device provides a clock signal for the slave device, which is 9 cycles during which one byte of data is transmitted each time. An interrupt will be triggered when the data register is empty, and data should be filled in time, when the slave device is in transmission mode. Otherwise, an underflow may occur. Additionally, another interrupt will be triggered when the data register is full, and the data should be read in time, when the slave device is in a reception mode. Otherwise, an overflow may occur. The master device has obtained all bytes of data after the last byte of data has been transmitted when the slave device is in the transmission mode. However, since the slave device is in the transmission mode, an interrupt will still be triggered again to indicate the slave device to write data to be transmitted to the data register when the data register is empty, while the slave device should not write new data to the data register anymore at this time.

In order to restrain the slave device from continuing transferring data to the master device after all the data requested by the master device has been transmitted by the slave device, it is necessary to stop trigging data transmission after the last byte of data has been transmitted, and the following manners may be used:

In the first manner, the interrupt for the transmission data register empty (TxE) may be disabled to overcome the drawback (i.e., keeps waiting for filling new data) which occurs after the last byte of data has been transmitted when the slave device is in the transmission mode. However, to disable the interrupt for the transmission data register empty requires hardware to be independently supported in this manner. In addition, a new problem, which is how to enable the interrupt for the transmission data register empty, occurs even if the interrupt for the transmission data register empty is disabled. For instance, logic judgments shall be added into the interrupt for the reception data register full (RxF) by the slave device to enable the interrupt for the transmission data register empty to make the slave device the transmission mode again, if a command to request the slave device to transmit data again is received from the master device when the slave device has transmitted all data and has been switched to the reception mode.

In the second manner, the operation mode of the slave device is switched to the reception mode, and a reception data register is null-read again to make the interrupt for the reception data register full not trigger, such that the interrupt is disabled to stop the slave device transmitting data to the master device. However, the process is complex, and the operations during the process are not easy to comprehend. In addition, there will be plenty of status bits that have to be judged, and the operation mode of the slave device will be repeatedly switched to be in the transmission mode or the reception mode, when data transmission frequently happens between the slave device and the master device.

In the third manner, the empty transmission data register is filled by writing dummy data, thereby preventing the slave device from hanging in the interrupt for the transmission data register empty. However, writing the dummy data may cause a data error when the slave device transmits data again, such that the data transmission shall be affected.

SUMMARY

In view of the above, the embodiments of this disclosure provide a slave device connected to a master device via an I2C bus and a communication method thereof.

In accordance with one aspect of the disclosure, a communication method for a slave device connected to a master device via an I2C bus is provided. The communication method comprises detecting the condition of a byte end flag when the slave device is in a transmission mode, and clearing the byte end flag to stop transmitting data to the master device as the slave device is in the transmission mode when the byte end flag is detected to be in a first condition.

The first condition indicates all data requested by the master device has been transmitted by the slave device.

In accordance with another aspect of the disclosure, a slave device connected to a master device via an I2C bus is provided. The slave device comprises a detection module configured to detect the condition of a byte end flag when the slave device is in a transmission mode, and a processing module coupled to the detection module and configured to clear the byte end flag to stop transmitting data to the master device as the slave device is in the transmission mode when the byte end flag is detected to be in a first condition by the detection module. The first condition indicates all data requested by the master device has been transmitted by the slave device.

In accordance with another aspect of the disclosure, a slave device connected to a master device via an I2C bus is provided. The slave device comprises an arithmetic logic circuit configured to detect the condition of a byte end flag when the slave device is in a transmission mode, and a control circuit coupled to the arithmetic logic circuit and configured to clear the byte end flag to stop transmitting data to the master device as the slave device is in the transmission mode when the byte end flag is detected to be in a first condition by the arithmetic logic circuit. The first condition indicates all data requested by the master device has been transmitted by the slave device.

The advantages of the present disclosure are listed as follow. In comparison with the traditional I2C design, the present disclosure is on a basis compatible with standard I2C bus protocol, which is simple in configuration. When the slave device is in the transmission mode, it is unnecessary to switch the operation mode of the slave device to stop the slave device from continuing to transmit data when the last byte of data has been transmitted. As a result, the response time can be short. At the same time, it is also unnecessary to stop the slave device from continuing transmitting data by reading the empty data register or writing dummy data, such that high reliability shall be achieved.

DETAILED DESCRIPTION

For a thorough understanding of the present disclosure, numerous specific details are set forth in the following description for purposes of illustration but not of limitation, such as particularities of system structures, interfaces, techniques, et cetera. However, it should be appreciated by those of skill in the art that, in absence of these specific details, the present disclosure may also be carried out through other implementations. In other instances, a detailed description of well-known devices, circuits, and methods is omitted, so as to avoid unnecessary details from hindering the description of the disclosure.

In order to facilitate the understanding of the present disclosure, a byte end flag (BND) newly set in a slave device of the present disclosure will be described first.

The BND is used to identify the status of data transmission.

When the slave device is in a transmission mode, the BND at least may be a first character or a second character. The first character is used to trigger the slave device to continue transmitting data, for instance, to trigger a processor of the slave device to write data to a transmission data register of the slave device. The second character is used to trigger the slave device to stop transmitting data, for instance, to trigger the processor of the slave device to stop writing data to the transmission data register of the slave device. The value of the BND can be set via hardware of the slave device, for instance, a register thereof. In a particular application, the first character may be 1, and the second character may be 0, or in another application, the first character may be 0, and the second character may be 1.

The BND further includes a first condition and a second condition respectively indicating that all data requested by a master device has been transmitted by the slave device and that a portion of data requested by the master device has been transmitted by the slave device. Particularly, the first condition and the second condition could be divided according to a value of the BND and the duration of the value. For instance, in some embodiments, when the duration during which the BND is the first character is larger than a time value, the BND is determined to be in the first condition; when the duration during which the BND is the first character is not larger than the time value, the BND is determined to be in the second condition. In other words, the duration for the first condition is longer than the duration for the second condition, when the BND is the first character. The time value or the duration could be set according to particular situations such as the read/write speed or the instruction execution speed of the slave device.

Figure 2:
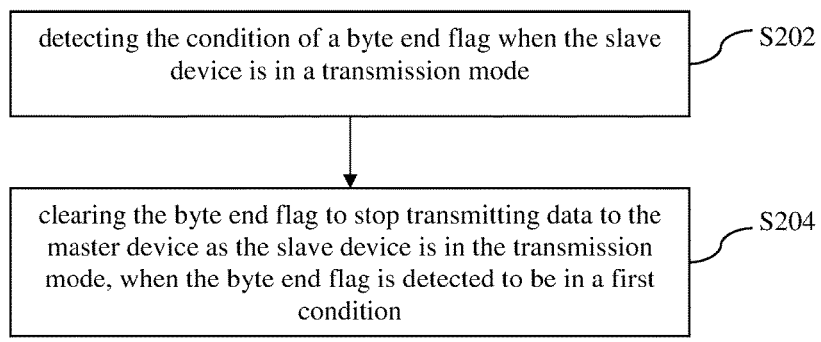
FIG. 2 is a flow chart of a communication method of a slave device according to some embodiments of the present disclosure.

Referring to FIG. 2, a flow chart of a communication method of a slave device according to a first embodiment of the present disclosure is depicted, in which the slave device is connected to a master device via an I2C bus. For purposes of illustration, the method is illustrated as being sequential. However, portions of the method may be performed in other orders or in parallel (e.g., simultaneously). The method may include the following blocks.

In block S202: the condition of the BND may be detected, when the slave device is in the transmission mode.

The execution main body of this embodiment is the slave device, which is defined relative to the master device. The master device and the slave device are respectively a device containing an I2C bus interface, for example, a processor.

The operation mode of the slave device includes a transmission mode and a reception mode, wherein the transmission mode means that the slave device transmits data to the master device, and the reception mode means that the slave device receives data from the master device. In this embodiment, a received read/write command signal of the master device may be automatically identified by hardware, and the operating mode of the slave device may be automatically configured to be the transmission mode or the reception mode based on the read/write command signal when a received slave address is matched with a self address of the slave device. Specifically, a read/write command bit corresponding to the slave address may be obtained; and the driver of the slave device may be configured to be in the transmission mode when the read/write command bit is a first symbol, and the driver of the slave device may be configured to be in the reception mode when the read/write command bit is a second symbol. In this embodiment, the first symbol and the second symbol are distinguished by different symbols so as to configure different operating modes, wherein the first symbol may be 1, the second symbol may be 0, and the slave address has 7 bits. In the present disclosure, the first symbol and the second symbol are not limited, and may be set according to the development requirements and habits.

The conditions of the BND may be set via hardware such as a register, which may include the first condition and the second condition when the slave device is in the transmission mode, wherein the first condition indicates that all data requested by the master device has been transmitted by the slave device, and the second condition indicates that a portion of the data requested by the master device has been transmitted.

In block S204: the BND may be cleared to stop transmitting data to the master device as the slave device is in the transmission mode, when the BND is detected to be in the first condition.

The transmitting data to the master device in the block S202 includes writing new data required to be transmitted to a transmission data register of the slave device. The clearing of the BND in the block S204 represents setting the value of the BND to be the second character. In this embodiment, the second character is 0, that is, the value of the BND is cleared to zero. At this time, the BND is the second character, such that the slave device stops transmitting data, and no longer writes new data to the transmission data register of the slave device. When the BND is in the first condition, all data requested by the master device has been transmitted by the slave device, which means that the last byte of data has been transmitted. At this time, the slave device clears the BND, such that the slave device no longer writes new data to the transmission data register of the slave device, and then the slave device stops transmitting data to the master device without unnecessarily switching the operating mode thereof. In this embodiment, the clearing of the BND is implemented by writing 1/0 to the hardware for setting the BND. In other embodiments, the BND may be cleared in other manners, for instance, reading the value in the hardware for setting the BND so as to clear of the BND.

Figure 1:
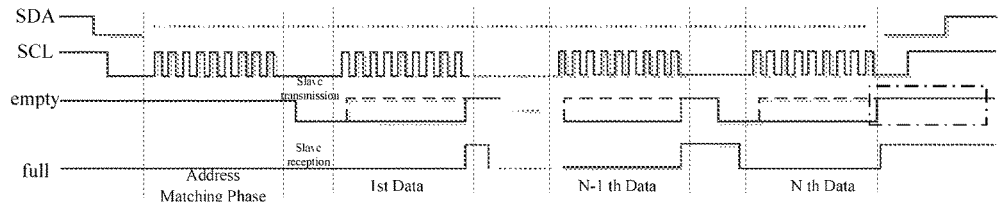
FIG. 1 is a waveform diagram of a slave device in a traditional I2C design.

Compared with the traditional I2C design, in the above-mentioned embodiment, the BND is adopted to identify the data transmission status when the slave device is in the transmission mode, which is on a basis compatible with standard I2C bus protocol and is simple in configuration. The operation mode of the slave device shall be not switched necessarily to stop the slave device from continuing to transmit data once the last byte of data has been transmitted, when the slave device is in the transmission mode. As a result, the response time may be short. At the same time, the slave device is stopped from continuing transmitting data without necessarily null-reading the data register or writing dummy data, which has high reliability and easy configuration. For developers, the driver development process shall be simplified and the system responding speed shall be further improved, since it is unnecessary to determine various condition bits such as the "empty" and the "full" shown in FIG. 1, and repeatedly switch the direction of transmissions (e.g., the transmission mode and the reception mode). What mentioned above provides the possibility to further improve the transmission rate of the I2C bus, and expands the application scenarios of the I2C bus.

In some embodiments, the data transmission to the master device is continued, when the BND is detected to be in the second condition.

The second condition indicates that a portion of data requested by the master device has been transmitted, that is, the remaining data requested by the master device is still not completely transmitted by the slave device. At this time, the slave device needs to continue transmitting data to the master device, wherein the step of "transmitting data to the master device" includes writing new data to the transmission data register of the slave device. The new data means the data that the slave device needs to be transmitted to the master device, which is also requested by the master device. Specifically, in the process of transmitting data from the slave device to the master device, that is, in the process of data transmission, the BND is set to be in the second condition each time one byte of data has been transmitted, and is set to be in the first condition when all data requested by the master device has been transmitted, when the slave device is in the transmission mode.

Figure 3:
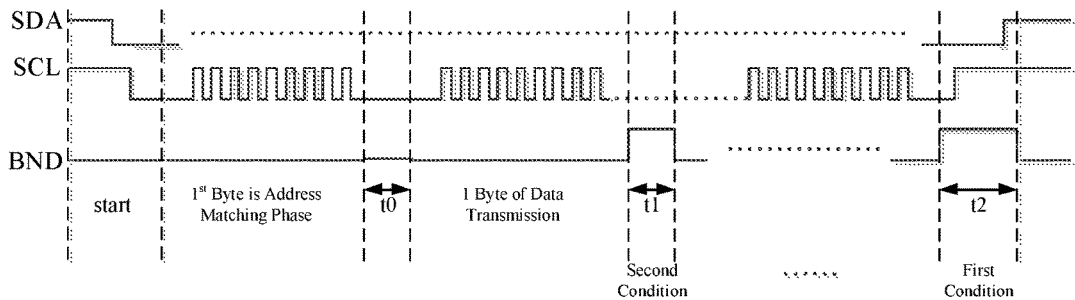
FIG. 3 is a waveform diagram of the slave device in the I2C design of the above-mentioned embodiments of the present disclosure.

The communication process when the slave device is in the transmission mode will be described in detail with reference to the waveform diagram in FIG. 3. Specifically, an example in which the first character is 1, the second character is 0, and the first symbol of the read/write command bit is 1.

When the slave device detects a start signal "start", the BND is set to 0. The slave device receives an address byte, and then the slave device is in an address matching phase, in which the BND always remains at 0. When the matching of the address byte is completed, the BND remains at 0. New data is to be written to the transmission data register of the slave device. After an initial time t0, the BND still remains at 0. The address byte includes the slave address and the read/write command bit. The slave device may be determined to be in the transmission mode by hardware, as the read/write command bit is the first symbol.

Subsequently, the slave device transmits one byte of data. Specifically, in the process of transmitting the byte of data, the BND remains at 0. When the transmission of the byte of data is completed, the BND is set to 1. Then the slave device is triggered to continue to write new data to the transmission data register of the slave device, that is to say, a next byte of data to be transmitted shall be wrote. After a first time t1, the writing of the next byte of data to the transmission data register is completed, then the BND is cleared to zero as the new data has been filled into the transmission data register. That is to say, the value of the BND is changed from 1 to 0, which instructs the slave device to stop writing data to the transmission data register, and then the slave device starts to transmit the newly filled next byte of data such that the slave device enters a next transmission phase. The duration during which the BND is set to 1 is the first time t1, which is not larger than a predetermined time value. Therefore, at this phase, the BND is in the second condition while the BND being set to 1.

After the slave device completes transmitting the new one byte of data, the BND becomes 0 again, and the slave device continues to transmit a following next byte of data written to the transmission data register thereof. Since the process is the same as the process of transmitting the previous one byte of data, it will not be recited herein.

Until the slave device completes transmitting the last byte of data, all data requested by the master device has been transmitted, and the BND is set to 1, such that the slave device is triggered to try to write new data. However, at this time, since all data requested by the master device has been transmitted, and no new data could be written to the transmission data register of the slave device, the BND remains at 1. After a second time t2, the slave device determines that the duration during which the BND is 1, which is the second time t2, is larger than the predetermined time value, that is to say, the BND is in the first condition, and 1/0 is written into the hardware for setting the set byte end flag BND, so as to clear the BND to zero. That is to say, the value of the BND is changed from 1 to 0, which means that the BND is cleared, and then writing data to the transmission data register is stopped, which shall trigger an interruption again, and the slave device is directly terminated to continue to transmit data to the master device. As a result, this communication process of the slave device which is in the transmission mode is stopped. The method in this embodiment could terminate the transmission of the slave device without null-reading a register or writing dummy data when the slave device is switched to be in the reception mode.

After that, the slave device waits for another start signal "start". If the start signal "start" is detected, a next communication process, which is same as in the above-mentioned process, is executed.

It should be noted that, in the above-mentioned communication process which is in the transmission mode, the slave device returns an acknowledge signal to the master device when receiving the address byte. The slave device completes transmitting one byte of data to the master device after receiving an acknowledge signal which is a feedback of the master device for receiving the previous byte of data. Specifically, for instance, after receiving the acknowledge signal of the master device, the slave device writes new byte of data to the transmission data register and performs transmission again.

Figure 4:
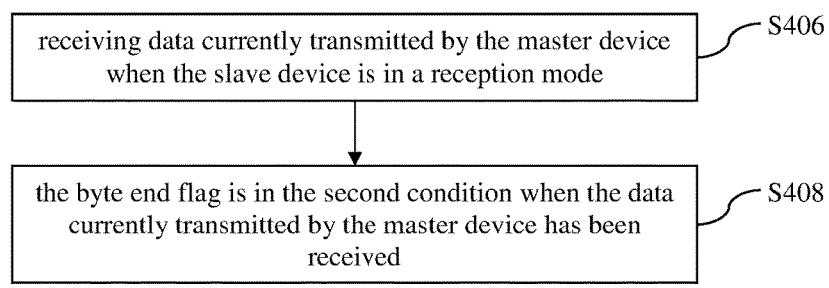
FIG. 4 is a partial flow chart of a communication method of a slave device according to some embodiments of the present disclosure.

Referring to FIG. 4, a partial flow chart of a communication method of a slave device according to a second embodiment of the present disclosure is depicted. The second embodiment differs from the first embodiment in that, on the basis of the first embodiment, the method further includes the following blocks.

In block S406: the data currently transmitted by the master device may be received when the slave device is in the reception mode.

The main body of this embodiment is also the slave device, wherein the operation mode of the slave device is configured in the same manner as in the above-mentioned embodiment, and will not be recited herein. It should be noted that, in this embodiment, when the slave device is in the reception mode, the read/write command bit is the second symbol when configuring the operation mode of the slave device. Receiving the data currently transmitted by the master device may include writing the received data currently transmitted by the master device into the reception data register of the slave device, so as to read the data currently transmitted by the master device from the reception data register.

In block S408: the BND is in the second condition when the data currently transmitted by the master device has been received.

The BND can be used to identify the status of the data transmission. The BND may be at least the first character or the second character. Wherein, the first character is used to trigger the slave device to continue receiving data, for instance, triggering a processor of the slave device to read the data transmitted by the master device from the reception data register of the slave device, and the second character is used to trigger the slave device to stop receiving data, for instance, triggering the processor of the slave device to stop reading the data transmitted by the master device from the reception data register of the slave device. The value of the BND could be set via hardware of the slave device, for instance, a register thereof. In a particular application, the first character may be 1, and the second character may be 0, or in another application, the first character may be 0, and the second character may be 1.

When the slave device is in the reception mode, if the slave device has received the data currently transmitted by the master device, the BND is in the second condition which indicates that the data currently transmitted by the master device has been received. Then the slave device continues receiving a next byte of data transmitted by the master device, and when the reception of the next byte of data is completed, the BND is in the second condition. Specifically, when the slave device is in the reception mode, in the process of the slave device receiving data transmitted by the master device, the BND is set to be in the second condition each time one byte of data has been received. Wherein, the process in which the slave device receives data transmitted by the master device includes a process of data transmission and a process of reading the data transmitted by the master device from the reception data register of the slave device.

Through the implementation of the above-mentioned embodiment, in comparison with the traditional I2C design, the BND is used to identify the data reception status when the slave device is in the reception mode, which is on a basis compatible with standard I2C bus protocol, and is simple in configuration.

Figure 5:
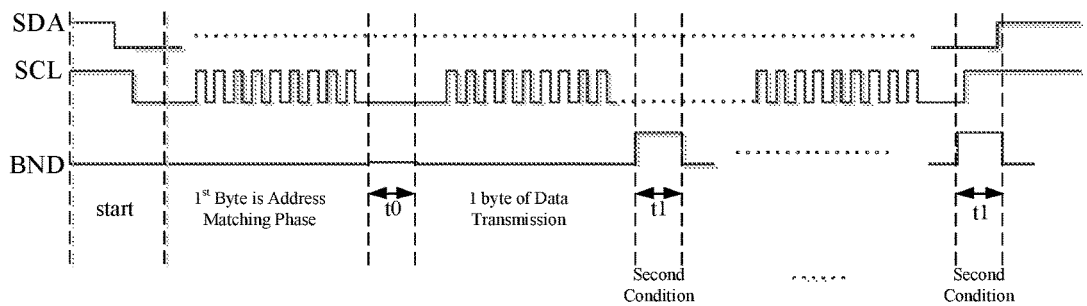
FIG. 5 is a waveform diagram of the slave device in the I2C design of the above-mentioned embodiments of the present disclosure.

The communication procedure when the slave device is in the reception mode will be described in detail with reference to the waveform diagram in FIG. 5. Specifically, an example in which the first character is 1, the second character is 0, and the second symbol of the read/write command bit is 0.

When the slave device detects a start signal "start", the BND is set to 0. The slave device receives an address byte, and then the slave device is in an address matching phase, in which the BND always remains at 0. When the receiving of the address byte is completed, the BND remains at 0. After the initial time t0, the BND still remains at 0. Wherein the address byte includes a slave address and a read/write command bit. Since the read/write command bit is the second symbol, the slave device is in the reception mode.

Subsequently, the slave device receives one byte of data. Specifically, in the process of receiving the byte of data, the BND remains at 0. When the byte of data has been received, the BND is set to 1. Then the byte of data, which has been just received, is read from the reception data register of the slave device. After the first time t1, the reading of the byte of data from the reception data register is completed, then the BND is cleared to zero. That is to say, the value of the BND is changed from 1 to 0 to stop to read data from the reception data register, and then the slave device starts to receive a next byte of data such that the slave device enters a next phase.

After the slave device completes reading the above-mentioned one byte of data, the value of the BND becomes 0, and the slave device is triggered to start to receive a next byte of data. Since the process is the same as the process of receiving the previous one byte of data, it will not be recited herein Until the transmission of the last one byte of data is completed by the master device, the BND is set to 1, and the last one byte of data is read from the reception data register of the slave device. After the first time t1, the last one byte of data has been read from the reception data register, and the BND is cleared to 0. That is to say, the value of the BND is changed from 1 to 0. At this time, when the slave device detects a stop signal "stop", the slave continues to be in a process of waiting to receive data from the master device, until the master device transmits data again or the slave device switches the operating mode.

It should be noted that, in the above-mentioned communication process which is in the reception mode, the slave device returns an acknowledge signal to the master device when receiving the address byte. The slave device returns the acknowledge signal to the master device whenever completing receiving one byte of data transmitted by the master device.

Figure 6:
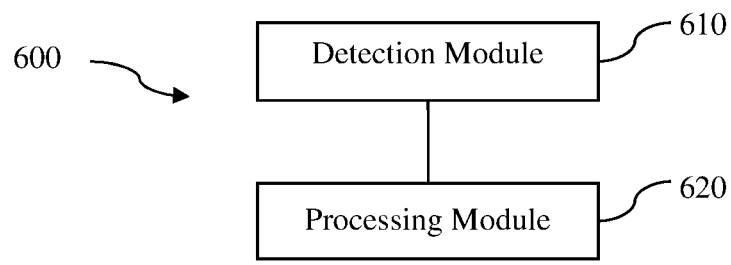
FIG. 6 is a schematic diagram illustrating a slave device according to some embodiments of the present disclosure.

Referring to FIG. 6, a schematic diagram illustrating a slave device according to a first embodiment of the present disclosure is depicted. The slave device 600 can be connected to a master device via an I2C bus. The slave device 600 may be a device containing an I2C bus interface, for example, a processor. The slave device 600 may include a detection module 610 and a processing module 620. The processing module 620 may be coupled to the detection module 610.

The detection module 610 may be configured to detect the condition of the BND when the slave device 600 is in the transmission mode. The BND may be used to identify the status of the data transmission, which may include a first state and a second state when the slave device is in the transmit mode, wherein the first state indicates that all data requested by the master device has been transmitted by the slave device, and the second state indicates that a portion of the data requested by the master device has been transmitted by the slave device. The details have been described above, which may be referred.

The processing module 620 may be configured to clear the BND to terminate the transmission of data to the master device as the slave device is in the transmission mode when the BND is detected to be in the first condition. Clearing BND represents setting the value of the BND to be the second character. In this embodiment, the second character is 0, that is, the value of the BND is cleared to 0. At this time, the BND is the second character, then the slave device stops to transmit data, no longer to write new data to the transmission data register of the slave device.

Furthermore, when the BND is in the first condition, all data requested by the master device has been transmitted by the slave device, which means that the last byte of data has been transmitted. At this time, the slave device clears the BND, such that the slave device no longer writes new data to the transmission data register of the slave device, and is unnecessary to switch the operating mode of the slave device when clearing the BND. Wherein, the clearing of BND has been described above.

Still furthermore, the processing module 620 may be further configured to continue to transmit data to the master device when the BND is detected to be in the second condition by the detection module 610. In the process of transmitting data from the slave device to the master device, the BND is set to be in the second condition each time one byte of data has been transmitted until all data requested by the master device has been transmitted, at which the BND is set to be in the first condition, when the slave device is in the transmission mode.

The above modules of the slave device may be utilized to execute the steps in the above-mentioned embodiments of the communication method, and the details could be referred to the description of the above-mentioned method embodiments. The above modules can be implemented by a processor. The processer may execute instructions stored in a memory to implement the modules described above. When the instructions are executed by the processor, the processor executes steps in the above-mentioned embodiments of the communication method. For example, executing the instructions stored in the memory by the processor, causes the processor to detect the condition of the BND when the slave device 600 is in the transmission mode, and clear the BND to terminate the transmission of data to the master device as the slave device is in the transmission mode when the BND is detected to be in the first condition.

Through the implementation of the above-mentioned embodiment, compared with the traditional I2C design, the BND is adopted to identify the data transmission status when the slave device is in the transmission mode, which is on a basis compatible with standard I2C bus protocol and is simple in configuration. The operation mode of the slave device shall be not switched necessarily to stop the slave device from continuing to transmit data once the last byte of data has been transmitted, when the slave device is in the transmission mode. As a result, the response time may be short. At the same time, the slave device is stopped from continuing to transmit data without necessarily null-reading the data register or writing dummy data, which has high reliability and easy configuration.

Figure 7:
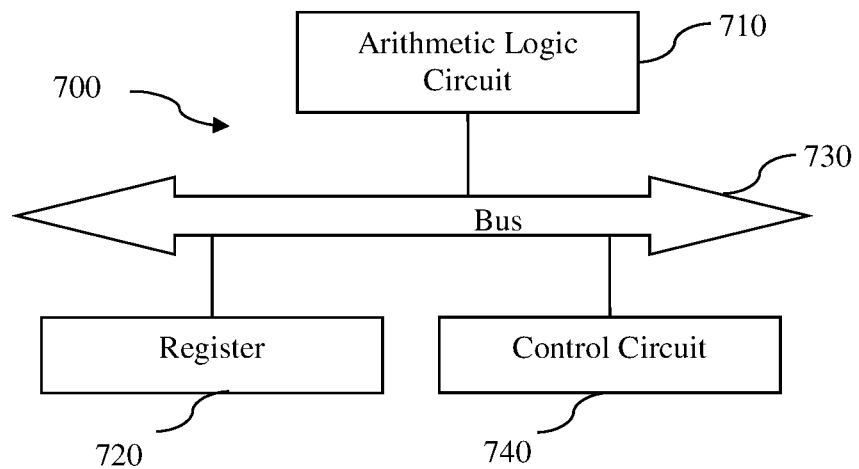
FIG. 7 is a schematic diagram illustrating a slave device according to some embodiments of the present disclosure.

Referring to FIG. 7, a schematic diagram illustrating a slave device according to a second embodiment of the present disclosure is depicted. The slave device 700 may be a device containing an I2C bus interface, for example, a processor. The slave device 700 may include an arithmetic logic circuit 710, a register 720, a bus 730, and a control circuit 740. The arithmetic logic 710, the register 720, and the control circuit 740 may be coupled to each other via the bus 730.

The arithmetic logic circuit 710 may be configured to detect the condition of the BND when the slave device 700 is in the transmission mode. The BND may be used to identify the status of the data transmission, which may include a first state and a second state when the slave device is in the transmit mode, wherein the first state indicates that all data requested by the master device has been transmitted by the slave device, and the second state indicates that a portion of the data requested by the master device has been transmitted by the slave device. The details have been described above, which may be referred.

The control circuit 740 may be configured to clear the BND to stop transmitting data to the master device as the slave device is in the transmission mode when the BND is detected to be in the first condition. Clearing the BND represents setting the value of BND to be the second character. In this embodiment, the second character is 0, that is, the value of the BND is cleared to 0. At this time, the BND is the second character, and the slave device stops to transmit data and no longer writes new data to the transmission data register of the slave device.

The register 720 may be configured to store the temporarily stored operands when the slave device executes commands, the intermediate operation result, or the best operation result, such as the BND, the address byte or bytes of data to be transmitted or received when the slave device is in the transmission mode or the reception mode, and so on.

Furthermore, when the BND is in the first condition, all data requested by the master device has been transmitted by the slave device, which means that the last byte of data has been transmitted. At this time, the control circuit 740 clears the BND, such that the control circuit 740 no longer writes new data to the transmission data register of the slave device, and it is unnecessary to switch the operating mode of the slave device when clearing the BND. Wherein, the clearing of the BND has been described above.

Still furthermore, the control circuit 740 may be further configured to continue to transmit data to the master device when the BND is detected to be in the second condition. In the process of transmitting data from the slave device to the master device, that is, in the process of data transmission, the BND is set to be in the second condition each time one byte of data has been transmitted until all data requested by the master device has been transmitted, at which, the BND is set to be in the first condition, when the slave device is in the transmission mode.

It should be noted that, in this embodiment, the slave device 700 also comprises other circuits within a processor, such as an instruction buffer configured to issuing a plurality of predetermined instructions to the arithmetic logic circuit 710.

The components of the above slave device may be utilized to execute the steps in the above-mentioned method embodiments, and the details could be referred to the description of the above-mentioned method embodiments.

The above description depicts merely some exemplary embodiments of the disclosure, but not to limit the scope of the disclosure. Any equivalent structure or flow transformations made with the specification and drawings in the disclosure, or any direct or indirect applications of the disclosure on other related fields, shall all be covered within the protection of the disclosure.

What is claimed is:

1. A communication method for a slave device connected to a master device via an I2C bus, comprising:
    detecting a condition of a byte end flag when the slave device is in a transmission mode, wherein the byte end flag is set via a register of the slave device; and
    clearing the byte end flag to stop transmitting data to the master device as the slave device is in the transmission mode, when the byte end flag is detected to be in a first condition;
    wherein the first condition indicates all data requested by the master device has been transmitted by the slave device; and
    wherein the first condition and a second condition are determined based on a value of the byte end flag and a duration during which the byte end flag is the value, wherein the duration during which the byte end flag is a first character being larger than a time value indicates the byte end flag is in the first condition, and the duration during which the byte end flag is the first character being less than or equal to the time value indicates the byte end flag is in a second condition.

2. The communication method of claim 1, further comprising:
    continuing transmitting data to the master device when the byte end flag is detected to be in the second condition, wherein the second condition indicates a portion of the data requested by the master device has been transmitted by the slave device.

3. The communication method of claim 2, wherein the byte end flag is set to be in the second condition each time one byte of data has been transmitted and is set to be in the first condition when all the data requested by the master device has been transmitted, when the slave device is in the transmission mode.

4. The communication method of claim 2, wherein the transmitting the data to the master device comprises:
    writing new data to a transmission data register of the slave device.

5. The communication method of claim 1, wherein the transmitting the data to the master device comprises:
    writing new data to a transmission data register of the slave device.

6. The communication method of claim 1, wherein the duration for the first condition is longer than the duration for the second condition.

7. The communication method of claim 1, further comprising:
    receiving the data currently transmitted by the master device when the slave device is in a reception mode; and
    continuing obtaining data transmitted by the master device when the data currently transmitted by the master device has been received, in which the byte end flag is in the second condition.

8. The communication method of claim 7, wherein the receiving the data currently transmitted by the master device comprises:
    writing the received data currently transmitted by the master device to a reception data register of the slave device.

9. The communication method of claim 7, wherein the byte end flag is set to be in the second condition each time one byte of data has been received, when the slave device is in the reception mode.

10. The communication method of claim 7, further comprising:
    automatically identifying a received read/write command signal of the master device by hardware, and automatically configuring the operating mode of the slave device to be the transmission mode or the reception mode based on the read/write command signal when a received slave address is matched with a self address.

11. The communication method of claim 1, further comprising:
    automatically identifying a received read/write command signal of the master device by hardware, and automatically configuring the operating mode of the slave device to be the transmission mode or the reception mode based on the read/write command signal when a received slave address is matched with a self address.

12. The communication method of claim 11, wherein the automatically configuring the operating mode of the slave device to be the transmission mode or the reception mode based on the read/write command signal comprises:
    obtaining a read/write command bit corresponding to the slave address; and
    configuring a driver of the slave device to be in the transmission mode when the read/write command bit is a first symbol and configuring the driver of the slave device to be in the reception mode when the read/write command bit is a second symbol.

13. A slave device connected to a master device via an I2C bus, the slave device comprising a processor and a non-transitory memory having instructions stored thereon, which when executed by the processor, cause the processor to:
    detect the condition of a byte end flag when the slave device is in a transmission mode, wherein the byte end flag is set via a register of the slave device; and
    clear the byte end flag to stop transmitting data to the master device as the slave device is in the transmission mode, when the byte end flag is detected to be in a first condition;
    wherein the first condition indicates all data requested by the master device has been transmitted by the slave device; and
    wherein the first condition and a second condition are determined based on a value of the byte end flag and a duration during which the byte end flag is the value, wherein the duration during which the byte end flag is a first character being larger than a time value indicates the byte end flag is in the first condition, and the duration during which the byte end flag is the first character being less than or equal to the time value indicates the byte end flag is in the second condition.

14. The slave device of claim 13, wherein the instructions, when executed by the processor, further cause the processor to continue transmitting data to the master device when the byte end flag is detected to be in the second condition, wherein the second condition indicates a portion of data requested by the master device has been transmitted when the slave device is in the transmission mode.

15. A slave device connected to a master device via an I2C bus, comprising:
- an arithmetic logic circuit configured to detect the condition of a byte end flag when the slave device is in a transmission mode, wherein the byte end flag is set via a register of the slave device; and
- a control circuit coupled to the arithmetic logic circuit and configured to clear the byte end flag to stop transmitting data to the master device as the slave device is in the transmission mode when the byte end flag is detected to be in a first condition by the arithmetic logic circuit;
- wherein the first condition indicates all data requested by the master device has been transmitted by the slave device; and
- wherein the first condition and a second condition are determined based on a value of the byte end flag and a duration during which the byte end flag is the value, wherein the duration during which the byte end flag is a first character being larger than a time value indicates the byte end flag is in the first condition, and the duration during which the byte end flag is the first character being less than or equal to the time value indicates the byte end flag is in the second condition.

* * * * *